US010703343B2

United States Patent
Grasso et al.

(10) Patent No.: US 10,703,343 B2
(45) Date of Patent: Jul. 7, 2020

(54) CLEANING DEVICE INTENDED TO SPRAY AT LEAST ONE FLUID TOWARDS A SURFACE TO BE CLEANED OF A MOTOR VEHICLE

(71) Applicant: Valeo Systèmes d'Essuyage, Le Mesnil Saint Denis (FR)

(72) Inventors: Giuseppe Grasso, Issoire (FR); Marcel Trebouet, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 195 days.

(21) Appl. No.: 15/716,926

(22) Filed: Sep. 27, 2017

(65) Prior Publication Data

US 2018/0086318 A1 Mar. 29, 2018

(30) Foreign Application Priority Data

Sep. 28, 2016 (FR) ..................... 16 59178

(51) Int. Cl.
  *B60S 1/56* (2006.01)
  *B60S 1/54* (2006.01)
  *B60S 1/52* (2006.01)
  *B08B 3/02* (2006.01)
  *B60S 1/08* (2006.01)

(52) U.S. Cl.
  CPC ............... *B60S 1/56* (2013.01); *B60S 1/528* (2013.01); *B60S 1/54* (2013.01); *B08B 3/02* (2013.01); *B60S 1/0848* (2013.01)

(58) Field of Classification Search
  CPC .... B60S 1/56; B60S 1/528; B60S 1/54; B60S 1/848; B08B 3/02

USPC .......................................... 134/95.3
See application file for complete search history.

(56) References Cited

U.S. PATENT DOCUMENTS

| | | | |
|---|---|---|---|
| 2009/0244223 A1* | 10/2009 | Mizutani | B41J 2/1752 347/86 |
| 2015/0183406 A1 | 7/2015 | Tanaka et al. | |
| 2015/0296108 A1 | 10/2015 | Hayakawa et al. | |

FOREIGN PATENT DOCUMENTS

DE  102014213282 A1  1/2016

OTHER PUBLICATIONS

Preliminary Search Report and Written Opinion issued in corresponding French Application No. 1659178, dated May 15, 2017 (5 pages).

* cited by examiner

*Primary Examiner* — Tinsae B Ayalew
(74) *Attorney, Agent, or Firm* — Osha Liang LLP

(57) ABSTRACT

A cleaning device, intended to spray at least one fluid towards a surface to be cleaned of a motor vehicle, such as an optical sensor of an optical detection system, comprises at least one fluid intake and distribution device (D) into which are selectively admitted a cleaning fluid and a drying fluid through two distinct sets of runs from an intake end-fitting (110, 111) specific to each fluid.
According to the invention, a blocking element (5) is provided in the intake and distribution device (D). This blocking element is movable between a first position of blocking of the set of runs for a cleaning fluid and a second position of clearing of this set of runs for a cleaning fluid.

17 Claims, 2 Drawing Sheets

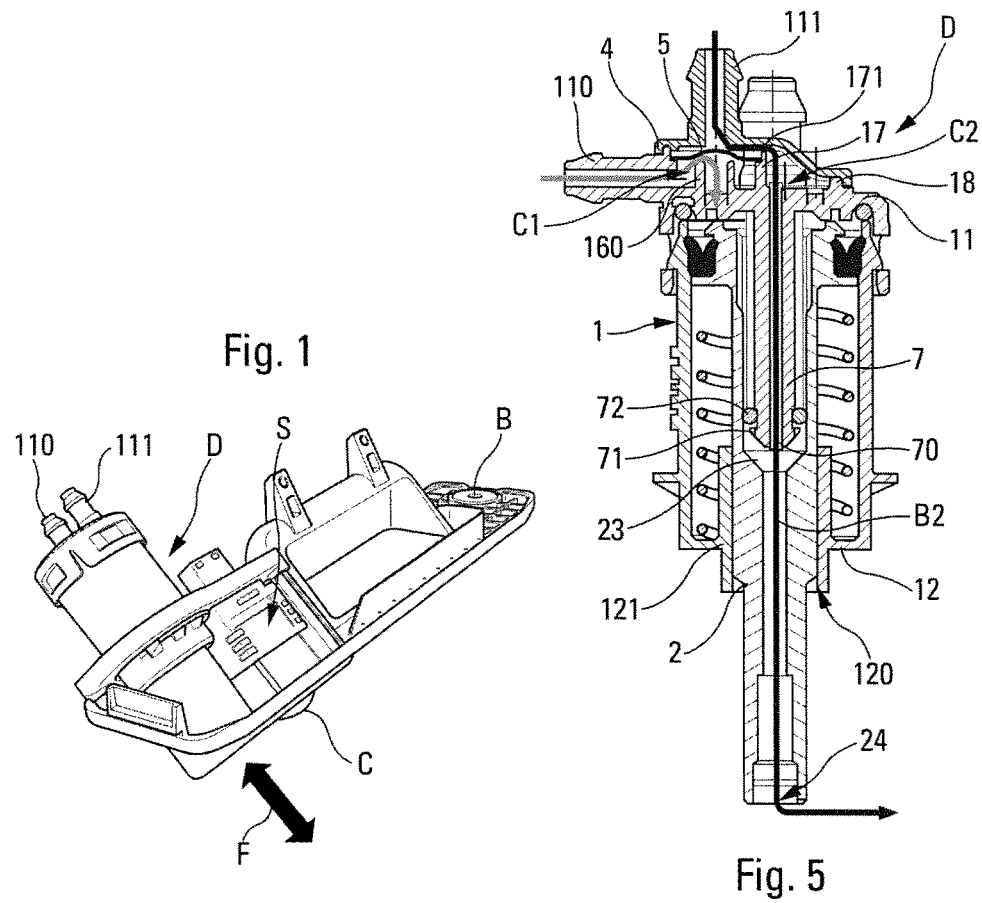
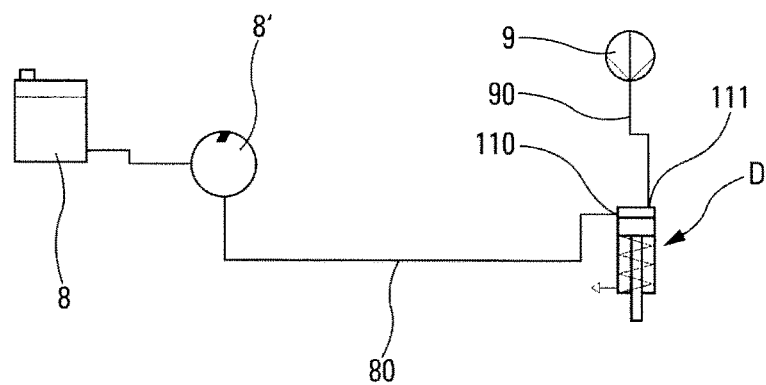

CLEANING DEVICE INTENDED TO SPRAY AT LEAST ONE FLUID TOWARDS A SURFACE TO BE CLEANED OF A MOTOR VEHICLE

The present invention relates to the field of driving assistance devices and, more particularly, to the field of the optical detection systems used for this purpose. The invention relates more particularly to the cleaning devices intended to spray at least one fluid towards a surface to be cleaned of a motor vehicle, such as an optical sensor of an optical detection system.

An optical detection system denotes any system comprising optical sensors such as cameras, laser sensors (commonly called LIDAR) or other sensors based on the emission and/or the detection of light in the visible spectrum or the spectrum invisible to man, in particular the infrared.

Such optical detection systems are being installed in an increasingly large number of motor vehicles in order to assist the driver of the vehicle in certain driving situations, one of which, well known, is parking assistance. For this assistance to be as effective as possible, the data supplied by the optical detection system must be of the best possible quality, and it is therefore essential to have optics specifically for performing these data acquisitions. To do this, a device for cleaning a sensor of the optical detection system (for example the lens of an image-capturing camera) can be controlled to inject, onto said sensor, a cleaning fluid just before the detection is made (for example the image capture). These cleaning devices must not hamper the operation of the optical sensor, and they must be as compact as possible to meet the bulk constraints of the vehicle. Moreover, since the cleaning fluid sprayed onto such an optical sensor to drive dirt from it is, more often than not, a liquid, it is advantageous to dry this optical sensor as quickly as possible to avoid any risk of pollution of the signal by any traces that such a liquid might leave (drops, runs, etc.). For that, it is known practice to spray onto the optical sensor, after the cleaning fluid, a flow of air (or another drying fluid) which makes it possible to clear this sensor of the cleaning fluid and of the dirt that the latter then brings with it. Such cleaning devices therefore include cleaning fluid and drying fluid transport and distribution means. More often than not, the cleaning fluid distribution circuit and the drying fluid distribution circuit (more often than not, air) comprise common portions and/or take a form of one nested with the other. In order to successively distribute cleaning fluid and drying fluid, it is known practice to use a distributor capable of controlling in particular the alternate intake, within the cleaning and drying fluid intake and distribution device, of one or other of these fluids.

These cleaning devices must also not hamper the operation of the optical sensor, and they must be as compact as possible to meet the bulk constraints of the vehicle. For that, more often than not, the cleaning and drying fluid distribution means include a part that is movable between a deployed cleaning position, in which distribution orifices that they include are located in the vicinity of the surface of the sensor to be cleaned, and a position of rest, in which this movable part is retracted so as not to hamper the optical detection by means of the sensor concerned.

More often than not, it is the pressure of the cleaning fluid admitted into this movable part which drives its displacement to its cleaning position. It is therefore suitable, once the cleaning is done, for the drying to be done, to have means which hold said movable part substantially in place for the drying fluid to be able to be distributed as close as possible to the surface of the sensor concerned and the distributor also ensures this function.

The presence of such a distributor, typically electronically driven, does however induce an additional cost and an additional risk of failure or of malfunctioning of the cleaning device.

The aim of the present invention is to propose a cleaning device intended to spray at least one fluid towards a surface to be cleaned of a motor vehicle, which does not require any associated distributor as previously described, in order in particular to limit the costs of obtaining the device, while preserving the effectiveness of the cleaning and of the drying of the optical sensor concerned.

To this end, the subject of the invention is a cleaning device intended to spray at least one fluid towards a surface to be cleaned of a motor vehicle, such as an optical sensor of an optical detection system, and comprising at least one fluid intake and distribution device into which are selectively admitted a cleaning fluid and a drying fluid through two distinct sets of runs from an intake end-fitting specific to each fluid. According to the invention, the device further comprises, in the intake and distribution device, a blocking element movable between a first position of blocking of the set of runs for a cleaning fluid and a second position of clearing of this set of runs for a cleaning fluid.

A surface to be cleaned could be understood to be an optical sensor of an optical detection system, the lens of a camera, or a particular element of the bodywork.

According to the invention, in the first position of blocking of the movable element, the arrival of cleaning fluid into the intake and distribution device is blocked and the output of the cleaning fluid not used in the preceding cleaning operation is also blocked. Particularly in the case where it is the supply of cleaning fluid which makes it possible to deploy the intake device into an operational position of cleaning and of drying, it is advantageous to block the operational position for the drying operation to be able to take place optimally, and it is noteworthy according to the invention that the blocking of this operational position is made possible with elements embedded in the intake and distribution device.

The blocking element can participate in defining the sets of runs of the cleaning and drying fluids, the configuration of which is then modified by the position of the blocking element.

The displacement of the blocking element between the first position and the second position as have just been specified is obtained by the pressure differential between the drying fluid and the cleaning fluid on either side of the blocking element.

In other words, the invention makes provision, when a predefined quantity of cleaning fluid is admitted into the intake and distribution device of the cleaning device according to the invention, for the pressure that this fluid exerts on the blocking element to cause the latter to be displaced into its second clearing position in which it allows the passage of the cleaning fluid along the set of runs while, on the contrary, the invention makes provision, when a predefined quantity of drying fluid is admitted into the fluid intake and distribution device, for the pressure that this fluid exerts on the blocking element to cause the latter to be displaced into its first position in which it prohibits the run of cleaning fluid.

Provision will be able to be made for the blocking element to block, at least partially, the intake of the fluid which exerts the lowest pressure on it. And, for example, in its position of clearing of the set of runs for the cleaning fluid, the blocking element can be configured to at least partially block the set of runs for the drying fluid.

Throughout the following, the designations "upstream" and "downstream" will refer to the direction of flow of the cleaning and drying fluids in the intake and distribution device of the cleaning device according to the invention. Thus, the designation "upstream" refers to the side of the latter through which these cleaning and drying fluids are admitted into it, and the designation "downstream" refers to the side of the latter through which the cleaning and drying fluids are distributed outside of the device, towards the surface of the optical sensor concerned. Reference can if necessary be made to an external and internal reference in relation to the body of the intake and distribution device.

According to features of the invention, the fluid intake and distribution device can comprise a hollow body for the intake respectively of the cleaning fluid and of the drying fluid, a stem for distributing these fluids housed inside the hollow body, and including drying and cleaning fluid distribution orifices, and an intake cap, secured to an upstream bottom delimiting one end of the hollow body. And the blocking element can in this case be inserted between the intake cap and the upstream bottom.

Provision can be made for the intake end-fittings to be borne by distinct elements, with at least one intake end-fitting borne by the intake cap.

In the cleaning device according to the invention, the distribution stem can be mounted so as to be movable in relation to the hollow body, and, that way, the device can include means for displacing the distribution stem between a position of rest and a deployed position. These means for displacing the distribution stem can notably comprise means common with the sets of runs of one of the fluids, that is to say the circulation of at least one fluid through the intake and distribution device participates in displacing the distribution stem inside the hollow body. And these means for displacing the distribution stem can comprise a stem position elastic return element.

The hollow body can have a general substantially cylindrical form, and it can be produced in two parts linked together by a closure ring. Provision can be made for the hollow body to consist of an upstream part, formed by a peripheral wall and an upstream bottom, a downstream part, formed by a peripheral wall and a downstream bottom, and a closure ring which ensures the link between the upstream part and the downstream part. The peripheral wall of the upstream part of the hollow body and the peripheral wall of the downstream part of the hollow body can then both be of substantially cylindrical form and have internal and external diameters, and axial dimensions, that are substantially identical.

The closure ring can be configured to accommodate the peripheral walls of the upstream and downstream parts of the hollow body bearing against one another, and it can include a first and a second sleeve forming guiding means for the upstream and downstream parts of the hollow body upon the assembly thereof. Upon the assembly of the hollow body, the upstream part and downstream part of the latter are thus fitted respectively onto the first sleeve and onto the second sleeve. The upstream part, downstream part and closure ring of the hollow body thus delimit a cavity which forms the interior of the hollow body.

The device can comprise means for sealing this cavity off from the outside of the device according to the invention, which notably take the form of two O-ring seals each inserted into a groove arranged for this purpose respectively at the periphery of the internal wall of the upstream bottom and at the periphery of the internal wall of the downstream bottom.

The upstream bottom blocks the cavity of the hollow body in the upstream direction, substantially at right angles to the peripheral wall of the upstream part thereof. From the upstream bottom a cleaning fluid intake end-fitting can extend, opposite the cavity forming the interior of the hollow body. This end-fitting can have a substantially cylindrical form and be pierced right through by an intake channel for the corresponding fluid, and it can extend along an axis substantially parallel to the upstream bottom.

The upstream bottom delimiting one end of the hollow body can thus bear a cleaning fluid intake end-fitting, pierced by a cleaning fluid intake channel, while the drying fluid intake end-fitting, pierced by a drying fluid intake channel, is borne by the intake cap, secured to this upstream bottom. As specified, the blocking element can then be inserted between the intake cap and the upstream bottom, and therefore between these two fluid intake channels.

The upstream bottom is also pierced right through by a cleaning fluid intake orifice. This intake orifice passes through the wall of the upstream bottom and thus connects the cavity of the hollow body and the upstream part of the upstream bottom. According to the invention, the wall of the intake orifice is prolonged, in the upstream direction, in an intake pipe. This intake pipe and the cleaning fluid intake channel can be defined and arranged in such a way that said intake pipe forms an obstacle to the downstream end of said intake channel, but without totally blocking the latter. In other words, the intake pipe and the cleaning fluid intake channel are arranged successively in the set of runs for cleaning fluid, the blocking element being configured to block the circulation from one to the other in the first blocking position.

Moreover, the drying fluid intake pipe and intake channel can be coaxial, or substantially coaxial, and the blocking element can in this case be arranged substantially at right angles to the respective axes of elongation of the drying fluid intake pipe and intake channel.

According to another feature of the invention, the upstream bottom comprises, extending in the downstream direction from its internal face, a run pipe pierced right through, from upstream to downstream, by a run channel. A peripheral groove can be arranged in the external wall of the run pipe, in the vicinity of the downstream end thereof, to accommodate a seal.

According to a series of features, taken alone or in combination, and in particular relating to an arrangement of the space arranged between the cap and the upstream bottom, provision will be able to be made for:

the intake cap to include means capable of cooperating with the upstream bottom to allow said intake cap to be fitted with the latter, in such a way that, when it is engaged and blocked with said upstream bottom by said cooperation means, it delimits, with said upstream bottom, an intake volume in which emerge the cleaning fluid intake channel, the drying fluid intake channel, the intake pipe and the run channel;

the upstream bottom to include, extending in the upstream direction, a partitioning wall which divides the volume arranged between the upstream bottom and the cap into two intake chambers of distinct volumes;

the partitioning wall to be arranged transversely, on the upstream bottom, between the run pipe and the intake pipe; transversely should be understood to mean the direction at right angles to the direction of longitudinal extension of the device and in particular at right angles to the direction of displacement of the distribution stem;

the axial dimension of the partitioning wall to be greater than that of the intake pipe;

the blocking element to be arranged to bear on a shoulder arranged on the upstream bottom;

the shoulder to include a part arranged at the upstream end of the bearing wall and a part arranged in the wall of the drying fluid intake end-fitting, in proximity to the downstream end thereof;

the blocking element to be fixed to the walls delimiting the first chamber;

the blocking element to be fixed at the level of its peripheral portion, the movable portion of the blocking element being its central part;

the blocking element to rest on the upstream end face of the intake pipe in the blocking position, so as to block the cleaning fluid on either side of the membrane, in the chamber and in the intake pipe;

the drying fluid intake channel to emerge in the first chamber, against the blocking element, a passage between the first chamber and the second chamber being formed between the downstream end of the partitioning wall and the intake cap;

the run pipe and its run channel to extend from the second intake chamber;

the downstream bottom of the hollow body to be pierced by an orifice whose walls are prolonged, on the one hand, in the upstream direction, within the hollow body and, on the other hand, in the downstream direction, to the outside of the hollow body, by a sleeve;

the dimensions of the distribution stem to be defined such that it can slide freely within the sleeve while remaining axially aligned therewith.

According to a particular implementation of the invention, the distribution stem is pierced right through, from upstream to downstream, by two distinct, substantially parallel channels. Among these channels, a cleaning fluid distribution channel and a drying fluid distribution channel can be distinguished, which each emerge, at the downstream end of the distribution stem, at one or more distribution orifices, respectively for the cleaning fluid and for the drying fluid.

In this context, a finger extends from the internal face of the upstream bottom and in the downstream direction. The finger is arranged transversely, on the upstream bottom, between the run pipe and the intake pipe. A peripheral groove can be arranged in the external wall of the finger, in the vicinity of the downstream end thereof, to accommodate a seal. Also, the finger can form, at its downstream end, a terminal appendage of slightly smaller diameter.

The cleaning fluid distribution channel and the drying fluid distribution channel are arranged transversely, within the distribution stem, in such a way that the run pipe and the finger can simultaneously be engaged respectively in said drying fluid distribution channel and in said cleaning fluid distribution channel upon the assembly of the intake and distribution device.

According to a feature of the invention, from the upstream end of the distribution stem to its downstream end, the cleaning fluid distribution channel comprises at least one upstream portion, an intermediate portion, whose diameter is slightly smaller than that of the upstream portion, and a downstream portion, whose diameter is smaller than that of the intermediate portion, and it is noteworthy that, in this context, these diameters and the external diameter of the finger and the dimensions of a seal arranged around this finger in the vicinity of its downstream end are defined for said finger to be able to slide in a seal-tight manner within the intermediate portion of the cleaning fluid distribution channel and allow passage to the cleaning fluid when the seal is within the upstream portion.

Moreover, from the upstream end of the distribution stem to its downstream end, the drying fluid distribution channel can have at least one upstream portion and one downstream portion whose diameter is smaller than that of the upstream portion, and these diameters and the external diameter of the run pipe and the dimensions of a seal arranged around this run pipe in the vicinity of its downstream end are defined for the run pipe to be able to slide in a seal-tight manner within the upstream portion of the drying fluid distribution channel.

The intake cap is intended to be fitted with the upstream bottom, upstream of the latter. According to the invention, the intake cap comprises, extending in the upstream direction, a drying fluid intake end-fitting advantageously pierced right through, from upstream to downstream, by a drying fluid intake channel. Of complex form, the intake channel comprises means capable of cooperating with the upstream bottom of the hollow body to allow said intake cap to be fitted with the latter. According to a preferred embodiment of the invention, these cooperation means comprise a shoulder capable of being engaged with the lip mentioned previously arranged on the upstream bottom, and a groove capable of accommodating a complementary lip arranged on the peripheral wall of the cleaning fluid intake end-fitting. When it is engaged and blocked with the upstream bottom by these cooperation means, the intake cap delimits, with said upstream bottom, an intake volume in which emerge the cleaning fluid intake channel, the drying fluid intake channel, the intake pipe and the run channel defined previously. It should be noted that, according to a preferred embodiment of the invention, the cleaning and drying fluid intake channels are located, when the intake cap is put in place on the upstream bottom, substantially at right angles to one another and arranged substantially on the same side of the fluid intake and distribution device, in proximity to one another.

According to a second implementation, provision can be made for the distribution stem to be pierced right through, from upstream to downstream, by a single cleaning and drying fluid distribution channel, which emerges, at the downstream end of said distribution stem, at one or more distribution orifices common to the cleaning fluid and to the drying fluid. In this implementation, the run channel and the single distribution channel are coaxial.

According to another series of features, that can be applied alone or in combination, and in one or other of the implementations presented, it will be possible to provide for:

the distribution stem to include, in the vicinity of its upstream end, a crown ring;

the elastic return element to bear against a face of the crown ring;

a peripheral groove to be arranged in the external wall of the crown ring, to accommodate a seal, in such a way that the distribution stem, equipped with said seal, can slide in a seal-tight manner within the hollow body.

According to one embodiment of the invention, the blocking element can consist of a deformable membrane.

The invention relates also to a motor vehicle equipped with an optical detection system, notably comprising an optical sensor, and equipped with a cleaning device as described previously.

The invention thus makes it possible, by the simple fitting of the abovementioned membrane, to perform the alternate intake and distribution of a cleaning fluid or of a drying fluid through the intake and distribution device, thus simplifying the overall architecture of a device for cleaning an optical sensor of an optical detection system of the motor vehicle concerned. Furthermore, through the arrangement which has just been described, the invention avoids, in all circumstances, any contact between the cleaning fluid and the drying fluid: the result thereof is a better efficiency of the cleaning of the sensor concerned, any risk of residual presence of the cleaning fluid in the drying fluid being dispelled.

Other features, details and advantages of the invention and of the operation thereof will emerge more clearly on reading the description given hereinbelow by way of indication, in relation to the attached figures, in which:

FIG. 1 is a perspective schematic view of a sensor of an optical detection system and of an associated cleaning device;

Figures 2, 3:
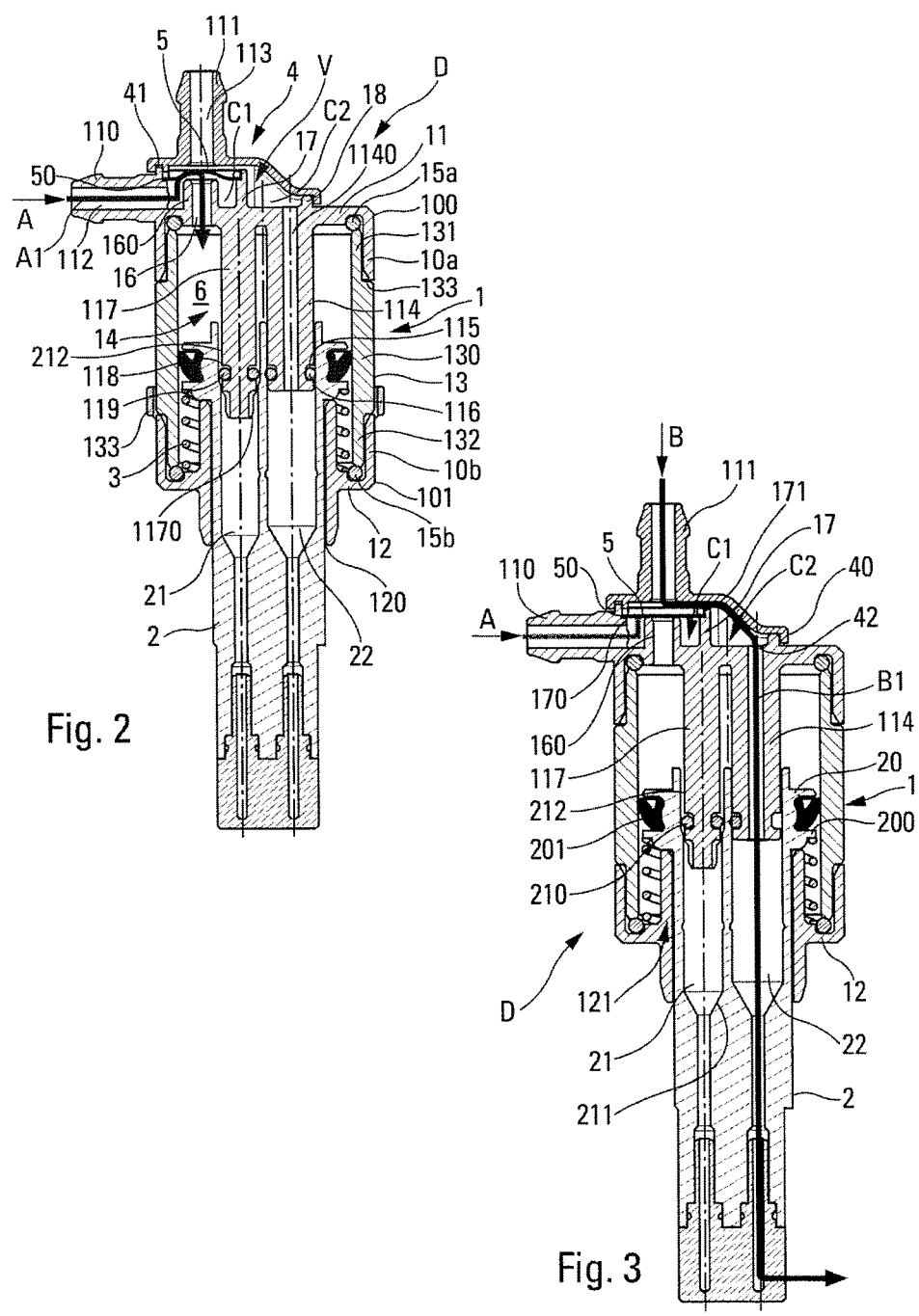
FIG. 2 is a cross-sectional schematic view of an intake and distribution device of a cleaning device according to a first embodiment of the invention, in which the cleaning fluid and drying fluid distribution channels are distinct, parallel to one another, the intake device here being configured with a blocking element of a set of runs for cleaning fluid in the clearing position.
FIG. 3 is a view similar to that of FIG. 2, with the blocking element of a set of runs for cleaning fluid in the blocking position.

FIG. 4 is a representation of the hydraulic architecture of a cleaning device according to the invention; and FIG. 5 is a cross-sectional schematic view of an intake and distribution device of a cleaning device according to a second embodiment of the invention, in which the cleaning fluid and drying fluid distribution channel form one and the same distribution channel, the intake device here being configured with a blocking element of a set of runs for cleaning fluid in the clearing position.

It should first of all be noted that while the figures explain the invention in detail for the implementation thereof, they can of course be used to better define the invention if necessary.

It is also recalled that, in the following description, the designations "upstream" and "downstream" refer to the direction of flow of the cleaning and drying fluids in the cleaning device according to the invention. Thus, the designation "upstream" refers to the side of the device according to the invention through which these cleaning and drying fluids are admitted into it, and the designation "downstream" refers to the side of the device according to the invention through which the cleaning and drying fluids are distributed out of it, towards a surface of an optical sensor of an optical detection system of a motor vehicle.

Moreover, in the following detailed description of several embodiments of a cleaning device, elements that are similar from one embodiment to another will be identified by the same references in the different figures.

FIG. 1 shows a cleaning device according to the invention, that is to say a device for cleaning an optical sensor C, forming part of an optical detection system S for a motor vehicle, the cleaning device comprising at least one fluid intake and distribution device D into which are selectively admitted a cleaning fluid and a drying fluid through two distinct sets of runs from an intake end-fitting 110, 111 specific to each fluid. The fluid intake and distribution device D is movable in translation in the direction illustrated by the arrow F, between a deployed position in which distribution orifices are arranged facing the optical sensor, and a retracted position (visible in FIG. 1) in which the fluid intake and distribution device is retracted into a bodywork structural housing B of the vehicle to, on the one hand, protect it and, on the other hand, not hamper the optical detection of the sensor.

As illustrated in FIGS. 2 and 3, an intake and distribution device D of a cleaning device according to the invention comprises at least one hollow body 1 for the intake respectively of a cleaning fluid and of a drying fluid, a stem 2 for distributing these fluids, and an elastic return element of spring type 3 and an intake cap 4. The stem is brought to slide inside the hollow body, driven in translation between two extreme positions by virtue of the elastic return force of the spring on the one hand and of the pressure of a fluid participating in the cleaning and/or in the drying and passing through the hollow body before leaving the intake and distribution device.

In the example illustrated by FIG. 2, the hollow body 1 has a general substantially cylindrical form, and it comprises two parts linked together by a closure ring 13. More specifically, the hollow body 1 consists of an upstream part 100, formed by a peripheral wall 10a and an upstream bottom 11, a downstream part 101, formed by a peripheral wall 10b and a downstream bottom 12, and a closure ring 13 which ensures the link between the upstream part 100 and the downstream part 101. The peripheral wall 10a of the upstream part 100 of the hollow body 1 and the peripheral wall 10b of the downstream part 101 of the hollow body 1 are both of substantially cylindrical form and have internal and external diameters, and axial dimensions, that are substantially identical.

According to this same embodiment, the closure ring 13 has a substantially cylindrical form and comprises, in the direction of its axis of revolution, a central part 130 which is prolonged, in the upstream direction, by an upstream sleeve 131 of the same internal diameter as the central part 130 and of external diameter slightly smaller than that of the latter, and, in the downstream direction, by a downstream sleeve 132, of the same internal diameter as the central part 130 and of external diameter slightly smaller than that of the latter. The external diameter of the central part 130 of the closure ring 13 is substantially equal to the external diameter of the peripheral walls, respectively 10a and 10b, of the upstream and downstream parts, respectively 100 and 101, of the hollow body 1. Similarly, the external diameters of the upstream sleeve 131 and of the downstream sleeve 132 are advantageously identical, and they are very slightly smaller than the internal diameters of the peripheral walls, respectively 10a and 10b, of the upstream and downstream parts, respectively 100 and 101, of the hollow body 1. Axially, the dimensions, respectively, of the upstream sleeve 131 and of the downstream sleeve 132 of the closure ring 13, are substantially equal to the internal axial dimensions of the peripheral walls, respectively 10a and 10b, of the upstream and downstream parts of the hollow body 1. Thus, the shoulders 133 formed at the intersection of the external wall of the central part 130 of the closure ring 13 and of the external walls of the upstream sleeve 131 and of the downstream sleeve 132 of this same closure ring, form, upon the assembly of the hollow body 1, bearing surfaces for the ends of the peripheral walls, respectively 10a and 10b, of the upstream and downstream parts of the hollow body 1. Upon the assembly of the hollow body 1, the upstream part and the downstream part of the latter are thus fitted respectively onto the upstream sleeve 131 and onto the downstream sleeve 132 which then produce a form for guiding the peripheral walls of the upstream and downstream parts of the hollow body 1 in this fitting.

The upstream part 100, the downstream part 101, and the closure ring 13 of the hollow body 1 thus delimit a cavity 14 which forms the interior of the hollow body 1. Means for sealing this cavity 14 off from the outside of the device according to the invention can be inserted between the closure ring 13 and, respectively, the upstream part 100 and the downstream part 101 of the hollow body 1, and these sealing means can notably take the form of two O-ring seals, respectively 15a and 15b, each inserted into a groove arranged for this purpose respectively at the periphery of the internal face of the upstream bottom 11 and at the periphery of the internal face of the downstream bottom 12.

Upon the assembly of the hollow body 1, the end of the upstream sleeve 131 and the end of the downstream sleeve 132 of the closure ring 13 come to bear on these O-ring seals, thus forming the cavity 14 of the hollow body in a seal-tight manner. This closure can be reinforced by additional means for blocking the closure ring 13 with the upstream and downstream parts of the hollow body, for example screws, not represented in FIG. 2, and inserted radially between the peripheral wall 10a of the upstream part of the hollow body and the first sleeve 131 of the closure ring, on the one hand, and/or between the peripheral wall 10b of the downstream part of the hollow body and the second sleeve 132 of the closure ring, on the other hand.

The upstream bottom 11 blocks the cavity 14 and the hollow body 1 in the upstream direction, substantially at right angles to the peripheral wall 10a of the upstream part 100 of said hollow body 1.

A cleaning fluid intake end-fitting 110 extends radially from the upstream bottom 11. In the case illustrated by FIG. 2, this end-fitting has a substantially cylindrical form, and it extends substantially parallel to the upstream bottom 11. According to the invention, the cleaning fluid intake end-fitting 110 is pierced right through, from upstream to downstream, by a cleaning fluid intake channel 112, the upstream end of this channel being configured to be coupled to a cleaning fluid supply pipe connected elsewhere to a cleaning fluid storage tank, not represented here. The downstream end of the cleaning fluid intake channel 112 emerges on a supply circuit comprising at least one chicane arranged on the external face of the upstream bottom 11, that is to say the face turned towards the outside of the hollow body 1.

The upstream bottom 11 is also pierced by a cleaning fluid intake orifice 16 connecting the cavity 14 of the hollow body 1 and the supply circuit arranged on the external face of the upstream bottom. The wall delimiting the intake orifice 16 is prolonged, protruding from the external face of the upstream bottom 11, in an intake pipe 160, which participates in forming the chicane of the supply circuit. It will be understood, particularly on reading FIG. 2, that the intake pipe 160 and the cleaning fluid intake channel 112 are defined and arranged in such a way that said intake pipe forms an obstacle to the downstream end of said intake channel, but without totally blocking the latter.

Moreover, the upstream bottom 11 includes, extending in the downstream direction from its internal face, a run pipe 114 pierced right through, from upstream to downstream, by a run channel 1140. The run pipe 114 extends inside the hollow body 1, by being at least partially in a duct formed in the stem 2 in which the run channel 1140 emerges. A peripheral groove 115 is arranged in the external wall of the run pipe 114, in the vicinity of the downstream end of the latter, to accommodate a seal 116, for example an O-ring seal whose purpose will be specified later.

In parallel, or substantially parallel, to the run pipe 114, a finger 117, advantageously substantially cylindrical, extends also from the internal face of the upstream bottom 11 and in the downstream direction. The finger 117 is arranged, on the upstream bottom 11, substantially between the run pipe 114 and the intake orifice 16. Advantageously, the axis of revolution of the finger 117 is substantially parallel to the axis of the run pipe 114, and to that of the intake pipe 160.

A peripheral groove 118 is arranged in the external wall of the finger 117, in the vicinity of the downstream end of the latter, to accommodate a seal 119, for example an O-ring seal, whose purpose will be specified later.

In the exemplary embodiment illustrated, the length of the finger 117, that is to say the distance over which it extends from the upstream bottom 11, is slightly greater than the length of the run pipe 114. And in particular, the downstream end part of the finger 117, which extends beyond the downstream end part of the pipe 114, is slightly reduced. In other words, the finger 117 comprises, at its downstream end, a terminal appendage 1170 of smaller diameter.

The upstream bottom 11 also comprises a partitioning wall 17, which extends protruding from the wall of the upstream bottom 11, at right angles thereto and in the upstream direction, and the axial dimension of which is slightly greater than that of the intake pipe 160. In the example illustrated, the partitioning wall 17 is arranged transversely, on the upstream bottom 11, between the run pipe 114 and the intake pipe 160. Finally, the upstream bottom 11 advantageously comprises, extending in the upstream direction, a lip 18, arranged in such a way that the run pipe 114 and its run channel 1140 are arranged transversely between said lip 18 and the partitioning wall 17 on said upstream bottom 11.

As presented previously, an intake cap 4 is arranged at least partly covering the upstream bottom 11, so as to participate in delimiting fluid circulation ducts, both cleaning fluid and drying fluid, that can be activated selectively according to implementation means which will be detailed hereinbelow.

The intake cap is intended to be secured to the upstream bottom 11, upstream of the latter. In the example illustrated, the cap 4 is force-fitted over the hollow body 1 with a peripheral flange forming a housing for the abovementioned lip 18, and a groove 41 capable of accommodating a complementary lip arranged on the peripheral wall of the cleaning fluid intake end-fitting 110.

The intake cap 4 comprises, extending in the upstream direction, a drying fluid intake end-fitting 111 pierced right through, from upstream to downstream, by a drying fluid intake channel 113. When it is secured to the upstream bottom 11, the intake cap 4 delimits, with said upstream bottom 11, an intake volume V in which emerge, as shown by the figures, the cleaning fluid intake channel 112, the drying fluid intake channel 113, the intake pipe 160 and the run channel 1140 defined previously.

As illustrated, the cleaning and drying fluid intake channels, respectively 112 and 113, and the intake pipe 160, are located, when the intake cap 4 is placed on the upstream bottom 11, on the same side of the intake and distribution device D in relation to the partitioning wall 17, in proximity to one another.

More particularly, the intake volume V is partitioned into a first intake chamber C1 and a second intake chamber C2, arranged on either side of the partitioning wall 17.

The first intake chamber C1 is arranged at the output of the cleaning fluid intake channel 112 and of the drying fluid intake channel 113 and the intake pipe 160 extends in the middle of this first intake chamber C1, protruding from the upstream bottom 11 which forms the bottom wall of this first chamber.

The second intake chamber C2 is arranged on the other side of the partitioning wall 17 in relation to the first intake chamber C1, and the bottom wall of this second chamber, formed by the upstream bottom, is open through an upstream end of the run channel 1140.

The height of the partitioning wall 17, that is to say its axial dimension away from the upstream bottom 11, and the dimensions and forms of the internal wall 42 of the intake cap 4, are defined in such a way that, when said intake cap is fitted over the upstream bottom 11, a space 171 of small dimension remains between the upstream end of said partitioning wall and said internal wall.

According to the invention, a membrane 5 is arranged in the intake volume V so as to be movable between two positions among a first intake pipe blocking position and a second clearing position. That way, the membrane 5 forms a blocking element for at least the set of runs for the cleaning fluid, as will be specified hereinbelow. In particular, in the case illustrated in the figures, the membrane 5 is inserted across the first intake chamber C1 by being substantially at right angles to the axis of the drying fluid intake channel 113. The membrane 5 is fixed at its periphery 50 to the walls delimiting this first intake chamber C1, and in particular the partitioning wall 17 and the wall of the drying fluid intake end-fitting 110, in proximity to the downstream end thereof. In the example illustrated, the membrane rests at its periphery 50 on shoulders 170 formed in these walls.

Advantageously, the membrane 5 is thus located both facing the drying fluid intake channel 113 and the intake pipe 160 of the upstream bottom 11. The operation of the membrane according to the supply of cleaning fluid and of drying fluid will be described hereinbelow. It should however be noted at this stage that, through its arrangement across the first intake chamber C1, the membrane 5 prevents both any intake of drying fluid into the first intake chamber C1, and any passage of the cleaning fluid to the second intake chamber C2.

Without departing from the context of the invention, it will be possible to provide for the blocking element to take the form of a mobile partition different from the membrane 5 as is illustrated here, provided that it acts as a valve making it possible to control the running of one or other fluid in the intake and distribution device of the cleaning device according to the invention.

The downstream bottom 12 of the hollow body 1 is pierced by an orifice 120 whose walls are prolonged, on the one hand in the upstream direction, within the cavity 14 of the hollow body and, on the other hand, in the downstream direction, to the outside of the hollow body 1, by a sleeve 121, whose external diameter is defined in relation to the spring 3 for the latter to be able to be inserted around said sleeve in the cavity 14. The other forms and dimensions of the sleeve 121 will be detailed later.

There now follows a more detailed description of the cleaning and drying fluid distribution stem 2.

In the example more particularly illustrated by the figures, the distribution stem 2 is of substantially cylindrical form, and its external diameter is slightly smaller than the internal diameter of the sleeve 121 of the downstream part 101 of the hollow body 1, such that it can slide freely within said sleeve while remaining axially aligned therewith. According to the invention, the distribution stem 2 comprises, in the vicinity of its upstream end, a crown ring 20 forming a protuberance on the perimeter of the distribution stem 2.

The distribution stem 2 is pierced, from upstream to downstream, by two distinct channels, namely a cleaning fluid distribution channel 21 and a drying fluid distribution channel 22. The cleaning fluid distribution channel 21 and the drying fluid distribution channel 22 each emerge, at the downstream end of the distribution stem 2, at one or more distinct distribution orifices, not represented in the figures. In other words, a first channel in the stem is specifically dedicated to the circulation of the cleaning fluid, and the fluid sprayed to clean the optical sensor leaves from one or more distribution orifices formed on this first channel, whereas a second channel, arranged alongside the first channel in the stem and distinct therefrom, is specifically dedicated to the circulation of the drying fluid, and the fluid sprayed to dry the sensor leaves from one or more distribution orifices formed specifically on this second channel.

Advantageously, the cleaning fluid distribution channel 21 and the drying fluid distribution channel 22 are parallel and arranged, in the distribution stem 2, with a spacing substantially identical to that which separates the run pipe 114 from the finger 117 in the hollow body 1. In other words, the hollow body 1 and the stem 2 of the device according to the invention are respectively configured for the run pipe 114 and the finger 117 to be able to be simultaneously engaged respectively in the drying fluid distribution channel 22 and in the cleaning fluid distribution channel 21 upon the assembly of the intake and distribution device D.

That way, two distinct sets of runs are formed for the cleaning and drying fluids. A set of runs for the drying fluid consists of the successive arrangement of the intake end-fitting 111 and of the intake channel 113, of the run pipe 114, pierced respectively by an intake channel 113, 1140, and the distribution channel 22 produced specifically in the stem 2 and in which the run pipe 114 emerges. The drying fluid passes from the intake end-fitting 111 to the second intake chamber C2 through the passage 171 arranged between the partitioning wall 17 and the cap 4, then from this second intake chamber to the drying fluid distribution channel 22 via the run pipe 114. Moreover, the set of runs for the cleaning fluid consists of the succession of the intake end-fitting 110 and of the intake channel 112, of the intake pipe 160, of the cavity 114 of the hollow body 1 between the upstream bottom 11 and the crown ring 20 of the stem, and of the distribution channel 21 produced specifically in the stem 2 and in which the finger 117 is housed. The cleaning fluid thus passes from the intake end-fitting 111 to the distribution orifices formed in the cleaning fluid distribution channel by passing first into the cavity 14 in which it is in contact with the outside of the stem 2. In that, the set of runs for the cleaning fluid forms part of the means for displacing the intake stem since the cleaning fluid injected into the cavity 14, pending its passage into the stem and its distribution via the distribution orifices, pushes on the stem against the elastic return force exerted by the spring. The displacement means thus consist of the cleaning fluid and of the means for filling the chamber with this cleaning fluid under pressure, and of the spring forming an elastic return element.

The drying fluid is observed to circulate from upstream to downstream of the device without being in contact with the cleaning fluid and without contact with the outside of the stem 2.

From the upstream end of the distribution stem 2 to its downstream end, the cleaning fluid distribution channel 21 has, in the device according to the invention, at least an upstream portion, an intermediate portion, the diameter of which is slightly smaller than the diameter of the upstream portion, and a downstream portion whose diameter is smaller than both that of the intermediate portion and that of the upstream portion. More specifically, the cleaning fluid distribution channel 21 forms, at the intersection between its upstream portion and its intermediate portion, a first shoulder 210, and it forms, at the intersection between its intermediate portion and its downstream portion, a second shoulder 211. It should be noted that, if the difference between the diameter of the upstream portion and that of the intermediate portion of the distribution channel 21 is relatively small, the difference between the diameter of the intermediate portion and that of the downstream portion of this same distribution channel 21 is significantly greater, such that the downstream portion of this cleaning fluid distribution channel constitutes a bottleneck zone of the latter.

The diameter of the intermediate portion of the cleaning fluid distribution channel 21 is very slightly greater than the external diameter of the finger 117. More specifically, according to the invention, the diameter of the intermediate portion of the cleaning fluid distribution channel 21, the external diameter of the finger 117 of the hollow body 1, and the dimensions of the sealing O-ring seal 119 arranged in the vicinity of the downstream end of this finger 117 are defined for said finger 117 to be able to slide in a seal-tight manner within the intermediate portion of the cleaning fluid distribution channel 21.

It will be understood that the result of the above is that a space 212 is formed between, on the one hand, the wall delimiting the upstream portion of the cleaning fluid distribution channel 21 and, on the other hand, the finger 117, such that cleaning fluid can circulate freely in this space between the cavity 14 and the first shoulder 210.

The drying fluid distribution channel 22 differs from the cleaning fluid distribution channel 21, notably in the absence of a space formed around the run pipe 114 that is sufficient to allow cleaning fluid originating from the cavity 14 to flow along this drying fluid distribution channel. From the upstream end of the distribution stem 2 to its downstream end, the drying fluid distribution channel 22 has, in the device according to the invention, at least an upstream portion and a downstream portion whose diameter is smaller than that of the upstream portion. More specifically, the drying fluid distribution channel 22 forms, at the intersection between its upstream portion and its downstream portion, a shoulder 220. It should be noted that the difference between the diameter of the upstream portion and that of the downstream portion of this same distribution channel is relatively great, and that the downstream portion of this drying fluid distribution channel constitutes a bottleneck zone of the latter.

The diameter of the drying fluid distribution channel 22, in its upstream portion, is very slightly greater than the external diameter of the run pipe 114 which prolongs the intake end-fitting 111 of said drying fluid. More specifically, according to the invention, the diameter of the upstream portion of the drying fluid distribution channel 22, the external diameter of the run pipe 114, and the dimensions of the sealing O-ring seal 116 arranged in the vicinity of the downstream end of this run pipe 114 are defined for the latter to be able to slide in a seal-tight manner within the upstream portion of the drying fluid distribution channel 22, such that, as specified previously, no fluid space is allowed between the run pipe and the drying fluid distribution channel 22.

According to the invention, the crown ring 20 of the distribution stem 2, situated in the vicinity of the upstream end thereof, has an external diameter slightly smaller than the internal diameter of the closure ring 13 of the hollow body 1, that is to say, in other words, than the diameter of the cavity 14 of this same hollow body 1.

A peripheral groove 200 is arranged in the external wall of the crown ring 20, to accommodate a seal 201 and, according to the invention, the external diameter of the crown ring 20 of the distribution stem 2 and the seal 201 are defined for the distribution stem 2, equipped with its seal 201, to be able to slide in a seal-tight manner within the cavity 14 of the hollow body 1. As illustrated, the seal 201 is a lip seal.

The assembly of the device according to the invention can then be performed as follows.

Initially, the downstream bottom 23 and the sleeve 13 are assembled by compressing the associated O-ring seal 15b between the two parts. The spring 3 is then placed around the sleeve 121 of the downstream bottom 12, bearing against the internal face of said downstream bottom 12.

The distribution stem 2, equipped with its seal 201 housed in the crown ring 20, is then inserted into the sleeve 121 of the downstream part 101 of the hollow body 1, in which it is, through its external diameter and the internal diameter of said sleeve, fitted to slide freely while remaining axially aligned therewith, the seal 201 being then located compressed against the internal wall of the closure ring 13, such that the distribution stem can slide freely but in a seal-tight manner within the latter. The crown ring 20 has a bearing surface for the spring 3 and its free end opposite upstream bottom wall, and the spring 3 thus participates in the positioning of the stem 2 in relation to the hollow body 1.

The upstream part 100 of the hollow body 1 is then fitted over the first sleeve 131 of the closure ring 13, bearing on the sealing O-ring seal 15a placed in the upstream bottom 11. In this operation, and through the respective dimensions of these different elements, the finger 117 and the run pipe 114 are located simultaneously engaged, respectively, in the cleaning fluid distribution channel 21 and in the drying fluid distribution channel 22 arranged in the distribution stem 2.

The membrane 5 is then placed bearing on the shoulder 170 previously defined. According to the invention, the axial dimension of the intake pipe 160 is defined so that, upon the placement thereof on the shoulder 170, the membrane 5 is also located bearing on the upstream end of said intake pipe 160 in a blocking position of the latter, which then participates in forming, with the shoulder 170, a seat for this membrane. The position of rest of the membrane 5, substantially flat, corresponding to this blocking position is particularly visible in FIG. 3.

Finally, the intake cap 4 is brought to cover the upstream part 100 to be fitted and blocked on the upstream bottom 11 of the hollow body 1 in particular by the cooperation of the lip 18 and of the shoulder 40 on the one hand and of the groove 41 and of the complementary lip described previously. As was able to be specified previously, the intake cap 4 and the partitioning wall 17 are arranged so that a space 171 is left to allow the passage of a fluid, in particular the drying fluid, from the drying fluid intake channel 113 to the second intake chamber C2.

The result of the above is that the relative positions of the distribution stem 2 and of the hollow body 1 are, within the cavity 14 of this same hollow body 1, defined by the balance which is established between the return force of the spring 3 and the force which can be exerted on the upstream face of the crown ring 20 of the distribution stem 2. In other words, the relative positions of the finger 117 and of the run pipe 114 within, respectively, the cleaning fluid distribution channel 21 and the drying fluid distribution channel 22 are also governed by the balance which will be established between the return force of the spring 3 and a force which will be exerted on the crown ring 20 of the distribution stem 2. Depending on the intensity of the force which will be applied on the upstream face of the crown ring 20 of the distribution stem 2, the latter will or will not be driven to slide in the downstream direction through the sleeve 121 of the downstream part 101 of the hollow body 1, by compressing or not compressing the spring 3. In the absence of any force applied on the upstream face of the crown ring 20 of the distribution stem 2, the latter is thus located in a first extreme position, or position of rest, substantially in the vicinity of the upstream bottom 11, and in which the spring 3 is totally relaxed. Conversely, when the spring 3 is compressed to the maximum, the distribution stem 2 reaches a second extreme position, or cleaning position, in which the stem has slid to the maximum in the downstream direction, through the sleeve 121 of the downstream part of the hollow body 1.

FIGS. 1 and 2, and FIG. 5 which will be described hereinbelow, show the device according to the invention with a distribution stem 2 in the deployed position: the pressure exerted by the cleaning fluid is stronger than the return force of the spring 3 being exerted on the distribution stem 2, thus keeping it in the vicinity of the downstream part of the hollow body 1 and totally compressing the spring 3.

When a cleaning fluid is admitted, in the direction represented by the arrow A, through the end-fitting 110, it circulates in the intake channel 112 to the downstream end of this channel, where it emerges in the first chamber C1 and where it encounters the obstacle formed by the intake pipe 160 and which is, at this stage, blocked by the membrane 5. The continuous line A1 illustrates the corresponding cleaning fluid path. The quantity of cleaning fluid present in this first chamber increases and, according to the invention, under the effect of the pressure of this cleaning fluid, the membrane 5 is pushed in such a way as to be deformed at its centre, since it is held at its periphery 50. In this way, the membrane assumes its clearing position, away from the intake pipe 160 so as to allow the passage of the cleaning fluid within the latter. It can be seen that, in this clearing position, the membrane tends to approach the downstream end of the drying fluid intake channel 113, blocking it at least partially. In other words, under the effect of the intake pressure of the cleaning fluid, the membrane 5 is pushed back against the downstream end of the drying fluid intake channel 113, that it blocks at least partially.

By emerging within the hollow body 1 through the intake orifice 16, the cleaning fluid then exerts, on the upstream face of the crown ring 20 of the distribution stem, a force which causes this distribution stem to slide in the downstream direction within the hollow body 1 away from the upstream wall and compressing the spring 3, thus increasing the volume of a final intake chamber 6 delimited in the cavity 14 of the hollow body by the internal wall of the closure ring 13, by the upstream face of the crown ring 20 of the distribution stem and by the internal face of the upstream bottom 11. The sliding in the downstream direction of the distribution stem 2 relative to the hollow body 1 causes a relative sliding of the finger 117 in the direction of the upstream portion of the cleaning fluid distribution channel 21 within the distribution stem. It is essential to clearly understand here that only the distribution stem is displaced, and that it is only the relative positions of its different components with the different components of the hollow body 1 which change.

The dimensions of the different components of the device according to the invention are defined in such a way that, in the relative sliding of the finger 117 towards the upstream portion of the cleaning fluid distribution channel 21, the sealing O-ring seal 119 placed at the downstream end of this finger 117 crosses, in the upstream direction, the first shoulder 210 defined by the intersection of the upstream portion and of the intermediate portion of the cleaning fluid distribution channel 21, and is thus located within said upstream portion of said distribution channel. And since the diameter of this upstream portion is slightly greater than that of the intermediate portion of this distribution channel, the sliding of the finger 117 within the latter is then no longer seal-tight. The cleaning fluid can therefore flow to the downstream portion of this distribution channel 21 and thus to the corresponding distribution orifices and to the surface of the optical sensor to be cleaned. It should be noted here that the presence of the appendage 1170, of smaller diameter, at the end of the finger 117, allows a better circulation of the cleaning fluid by avoiding any "suction" effect which could occur at the moment of the crossing, by the O-ring seal 119, of the first shoulder 210. The relative sliding of the finger 117 in the upstream portion of the cleaning fluid distribution duct 21 continues until the intake of fluid through the end-fitting 110 ceases, or until the downstream face of the crown ring 20 of the distribution stem is located bearing on the upstream end of the sleeve 121 of the hollow body 1. In this cleaning position, the distribution stem 2 is in an extreme position deployed downstream of the hollow body 1, which corresponds to a position in which the cleaning and drying fluid distribution orifices, respectively, situated at its downstream end are closest to the surface of the optical sensor to be cleaned.

When the intake of the cleaning fluid ceases, the return force of the spring 3 causes the latter to relax until it reverts to its initial position, while pushing on the downstream face of the crown ring 20, opposite the sleeve 121. In this movement, the distribution stem 2 then slides, this time, in the upstream direction of the device according to the invention, and the volume of the intake chamber 4 decreases, the latter being emptied notably through the cleaning fluid distribution channel 21. This continues until the O-ring seal 119 placed at the downstream end of the finger 117 crosses, this time in the downstream direction, the first shoulder 210 defined by the intersection of the upstream portion and of the intermediate portion of the cleaning fluid distribution channel 21 and this O-ring seal 119 is located in said intermediate portion of said distribution channel. The sliding of the finger 117 relative to the cleaning fluid distribution channel 121 then once again becomes seal-tight, and the cleaning fluid can no longer flow to the downstream portion of this same distribution channel and to the corresponding distribution orifices.

There is a requirement at this stage to prevent the cleaning fluid from being pushed back out of the device under the effect of the action of the spring, by preventing the return of the cleaning fluid to the storage tank from which it emanates. It is in fact important for the stem 2 to remain under pressure under the effect of the cleaning fluid still present in the final intake chamber 6 for it to remain deployed and for the drying fluid to be able to be sprayed from a position close to the optical sensor to be cleaned.

In this context, according to the invention, a predefined quantity of drying fluid is injected into the drying fluid intake channel 113, in the direction represented by the arrow B in FIG. 3, simultaneously, or with a slight stagger, at the moment when the distribution of cleaning fluid is stopped. The drying fluid circulates in the drying fluid intake channel 113, along the path B1 represented by continuous lines in FIG. 3, to the downstream end of said channel 113, where it encounters the obstacle formed by the membrane 5 which at least partially blocks the downstream end of the drying fluid intake channel 113, under the effect of the prior intake of a quantity of cleaning fluid, as described above. According to the invention, under the effect of the pressure of the drying fluid, the membrane 5 is then displaced so as to clear the downstream end of the intake channel 113 of this fluid and to allow the intake of the drying fluid into the intake volume V. The membrane 5 is then pressed against the seat formed by the shoulders and the end of the intake pipe 160, in the so-called blocking position. In other words, under the effect of the intake pressure of the drying fluid, the membrane 5 is pushed back against the intake pipe 160 that it blocks. It should be noted here that the intake pressure of the drying fluid will advantageously be defined slightly greater than the intake pressure of the cleaning fluid, so that the pressure differential thus recorded between the pressure exerted on the membrane by the drying fluid and that exerted on the opposite face of the membrane by the cleaning fluid allows the deformation of the membrane, even if cleaning fluid continues to be injected by the cleaning fluid intake end-fitting 110.

The drying fluid fills the part of the first intake chamber C1 between the cap and the membrane and escapes to the second intake chamber C2 through the space 171 arranged between the upstream end of the partitioning wall 117 and the internal wall 42 of the intake cap 4. From the second intake chamber C2, the drying fluid circulates through the run channel 1140 to the corresponding distribution orifices.

The fact that the membrane 5 completely blocks the upstream end of the intake pipe 160 makes it possible to close the final intake chamber 6 in a seal-tight manner, and the cleaning fluid that it still contains therefore remains trapped therein, counterbalancing the return force of the spring 3, thus keeping the distribution stem in the same relative position in relation to the hollow body 1 as it had upon the distribution of the cleaning fluid.

It should be noted that, during these various operations, the run pipe 114 is displaced, in the same way as the finger 117, relative to the distribution stem and, in particular, relative to the drying fluid distribution channel 22. Thus, when a quantity of cleaning fluid is admitted into the final intake chamber 6, the run pipe 114 is driven to slide within this distribution channel 22, in the direction of the upstream portion thereof. Advantageously, the respective dimensions of the run pipe 114 and of the distribution stem 2 are defined in such a way that the relative sliding of this run pipe within said drying fluid distribution channel 22 remains seal-tight regardless of the relative positions of these two elements.

The invention thus makes it possible, by the simple placement of the membrane 5, to perform the alternate intake and distribution of a cleaning fluid or of a drying fluid through the intake and distribution device D, thus simplifying the overall architecture of a cleaning device intended to spray at least one fluid towards a surface to be cleaned of a motor vehicle, such as an optical sensor of an optical detection system. Furthermore, the invention avoids, in all circumstances, any contact between the cleaning fluid and the drying fluid: the result thereof is a better efficiency of the cleaning of the sensor concerned, any risk of residual presence of the cleaning fluid in the drying fluid being dispelled.

There now follows a description of the hydraulic architecture of the cleaning device according to the invention, particularly referring to FIG. 4. The hydraulic architecture of the device according to the invention comprises a cleaning fluid storage tank 8 and a pump 8' for circulating this fluid. The pumped cleaning fluid is sent through a first duct 80, which emerges directly in the cleaning fluid intake end-fitting 110.

The hydraulic architecture also comprises a storage tank 9 for a drying fluid or for obtaining a flow of such a fluid, equipped if necessary with a compressor which makes it possible to obtain a flow of compressed air appropriate for the drying of an optical sensor of an optical detection system of a motor vehicle, a second duct 90 being arranged to deliver drying fluid from the storage tank inside the cleaning device.

There now follows a description of the device according to a second embodiment of the invention, referring in particular to FIG. 5. This second embodiment differs in particular from the first embodiment previously presented in the form of the stem for distributing the cleaning and drying fluids.

In particular, the cleaning fluid and drying fluid are run through a single distribution channel 23 to a set of common distribution orifices 24. FIG. 5 illustrates the intake and distribution device D with a distribution stem in its position of rest, in which no cleaning fluid or drying fluid is admitted into the latter, the distribution stem 2 being in its extreme retracted position relative to the hollow body 1.

In this embodiment, the invention also makes it possible, through the simple placement of the membrane 5, to perform the alternate intake and distribution of a cleaning fluid or of a drying fluid through the intake and distribution device D, thus simplifying the overall architecture of a device for cleaning an optical sensor of an optical detection system of the motor vehicle concerned.

In this second embodiment, the distribution stem 2 is pierced by a single distribution channel 23 which has, from upstream to downstream, at least an upstream portion, an intermediate portion whose diameter is slightly smaller than that of said upstream portion, and a downstream portion whose diameter is smaller than that of said intermediate portion.

It will be able to be noted that the device of this second embodiment also differs in the form of the hollow body, here formed by a tubular portion produced in a single piece. As previously, the downstream bottom 12 is pierced by an orifice 120 whose wall is prolonged, in the upstream direction, within the hollow body 1, and in the downstream direction, towards the outside of the intake and distribution device D, by a sleeve 121 whose internal diameter is slightly greater than the external diameter of the distribution stem 2, such that the latter can slide freely within said sleeve 121 while remaining axially aligned therewith.

In the same way as previously, the upstream bottom 11 comprises a cleaning fluid intake end-fitting 110, an intake pipe 160, a partitioning wall 17 and a lip 18, the features, forms and dimensions of which are similar, or substantially similar, to those of the same elements of the first embodiment described previously. The partitioning wall 17 here again produces the partitioning of the intake volume V into a first intake chamber C1 and a second intake chamber C2.

The upstream bottom 11 differs here from that implemented in the first embodiment in that it comprises, extending in the downstream direction, a single run pipe 7 pierced right through, from upstream to downstream, by a run channel 70. Advantageously, this run pipe 7 is radially arranged, on the upstream bottom 11, between the lip 18 and the bearing wall 17, in such a way that, when the distribution stem 2 is engaged in the sleeve 121 to perform the assembly of the intake and distribution device D, the run pipe 7 is engaged in the distribution channel 23 arranged in this distribution stem 2. More specifically, the run pipe 7 is radially arranged on the upstream bottom 11 in such a way that the run channel 70 with which it is pierced right through emerges, upstream of said upstream bottom 11, between the partitioning wall 17 and the lip 18, that is to say in the second intake chamber C2.

A peripheral groove 71 is arranged in the external wall of the run pipe 7, in the vicinity of its downstream end, to accommodate a seal 72, which can notably be an O-ring seal. According to the invention, the internal diameter of the intermediate portion of the distribution channel 23, the external diameter of the run pipe 7 and the seal 72 are defined for the run pipe 7 to slide in a seal-tight manner in the intermediate portion of the distribution channel 23, while fluid can pass beyond the seal when the stem slides in the upstream portion of the distribution channel.

The intake cap 4 is substantially identical to that which has been described previously in relation to the first embodiment, except that its dimensions are adapted to take account of the replacement of the run pipe and of the finger in the first embodiment by the single run pipe 7 of this second embodiment.

It is noteworthy that the membrane 5 is inserted in the same way as previously into the intake and distribution device, and that it ensures the same functions therein.

Thus, the intake of a predefined quantity of cleaning fluid or of a predefined quantity of drying fluid proceeds in the same way as that described previously in relation to the first embodiment, with the slight difference that the drying fluid and the cleaning fluid circulate in the same distribution channel, after having circulated separately, one in the run finger 7, via the run duct 70 (as represented schematically by the arrow B2 shown by continuous lines) and the other outside of this run finger 7, between the latter and the wall delimiting the outline of the distribution channel 23.

Such an arrangement is more compact than the arrangement of the first embodiment. It does not however allow a permanent segregation of the cleaning fluid and of the drying fluid, and, upon the distribution thereof, residual traces of cleaning fluid can also be run to the distribution orifices 24.

Whatever embodiment is chosen, the invention makes it possible, through the presence of the membrane 5, to dispense with the placement of a distributor electronically driven to alternately allow the intake of cleaning fluid or of drying fluid within the intake and distribution device D. Only a driving of the opening or of the closure of a simple stop valve associated with a cleaning fluid storage tank and/or with a drying fluid storage tank will be necessary, which simplifies the hydraulic architecture of the cleaning device as a whole, while retaining the effectiveness of the cleaning/drying operation for the optical sensor concerned. In practice, it is also possible to envisage having only the intake of the drying fluid driven by the opening of an appropriate valve, with, to obtain the desired pressure differential, a pressure greater than that of the cleaning fluid brought permanently to the intake and distribution device D. When the stop valve of the drying fluid circuit is closed, the pressure exerted by the cleaning fluid on the membrane 5 causes this fluid to be distributed through the intake and distribution device D, or else be returned to the storage tank when all of the cleaning and drying operations are finished. When the stop valve of the drying fluid circuit is open, the pressure of this fluid, greater than that exerted by the cleaning fluid on the membrane 5, then causes the only drying fluid to be distributed by the intake and distribution device D, while keeping the distribution stem in a deployed position for the drying operation following the cleaning operation to be performed as close as possible to the optical sensor to be cleaned.

The invention cannot however be limited to the means and configurations described and illustrated, and it applies also to any equivalent means or configurations and to any combination of such means. In particular, while the invention has been described here in an embodiment in which the general geometry of the intake and distribution device and of its components is a cylindrical geometry, it goes without saying that the invention applies to any type of geometry and forms, inasmuch as the elements producing the various seals and functionalities described here are present.

In particular, it will be possible to provide, in a variant, without departing in any way from the context of the invention, a blocking element having a different form from that of the membrane described previously, and/or other ways of driving the position of this blocking element. As a nonlimiting example, it would be possible to provide for the membrane not to be pushed into one extreme position or the other by the pressure exerted by one or other of the fluids and the resulting pressure differential, but by a mechanical or piezoelectric driving device.

The invention claimed is:

1. A cleaning device for spraying at least one fluid towards a surface to be cleaned of a motor vehicle, comprising:
   at least one fluid intake and distribution device into which are selectively admitted a cleaning fluid and a drying fluid through two distinct sets of runs from an intake end-fitting specific to each fluid,
   wherein the fluid intake and distribution device comprises:
      a blocking element movable between a first position of blocking of a set of runs of one of the fluids and a second position of clearing of the same set of runs,
      a hollow body for the intake respectively of the cleaning fluid and of the drying fluid, a stem for distributing these fluids housed inside the hollow body, drying and cleaning fluid distribution orifices, and
      an intake cap, secured to an upstream bottom delimiting one end of the hollow body.

2. The cleaning device according to claim 1, wherein the blocking element is rendered movable by the pressure differential between the drying fluid and the cleaning fluid on either side of the blocking element.

3. The cleaning device according to claim 1, further comprising means for displacing the distribution stem between a position of rest and a deployed position relative to the hollow body.

4. The cleaning device according to claim 3, wherein said means for displacing the distribution stem comprise means common with one of the sets of fluid runs.

5. The cleaning device according to claim 3, wherein the means for displacing the distribution stem comprise a stem-positioning elastic return element.

6. The cleaning device according to claim 5, wherein the upstream bottom bears a cleaning fluid intake end-fitting, pierced by a cleaning fluid intake channel, while the drying fluid intake end-fitting, pierced by a drying fluid intake channel, is borne by the intake cap.

7. The cleaning device according to claim 1, wherein the upstream bottom is pierced by a cleaning fluid intake orifice, passing through the wall of the upstream bottom, and the wall delimiting this orifice is prolonged, to the outside of the hollow body, in an intake pipe.

8. The cleaning device according to claim 7, wherein the drying fluid intake pipe and intake channel are coaxial, or substantially coaxial, the blocking element being arranged substantially at right angles to the respective axes of elongation of the drying fluid intake pipe and intake channel.

9. The cleaning device according to claim 7, wherein the cleaning fluid intake pipe and intake channel are arranged successively in the set of runs for cleaning fluid, the blocking element being configured to block the circulation from one to the other in the first blocking position.

10. The cleaning device according to claim 6, wherein the upstream bottom includes, in addition, extending in the downstream direction from an internal face, a run pipe pierced right through, from upstream to downstream, by a run channel.

11. The cleaning device according to claim 10, wherein the upstream bottom includes, extending in the upstream direction, a partitioning wall which divides the volume arranged between the upstream bottom and the cap into two distinct intake chambers.

12. The cleaning device according to claim 11, wherein the blocking element is fixed to the walls delimiting the first chamber.

13. The cleaning device according to claim 11, wherein the drying fluid intake channel emerges in the first chamber, against the blocking element, and the run pipe and its run channel extend from the second intake chamber, a passage being formed between the downstream end of the partitioning wall and the intake cap.

14. The cleaning device according to claim 1, wherein the distribution stem is pierced right through, from upstream to downstream, by a cleaning fluid distribution channel and a drying fluid distribution channel, that are distinct, which each emerge, at the downstream end of the distribution stem, at one or more distribution orifices, respectively for the cleaning fluid and for the drying fluid.

15. The cleaning device according to claim 1, wherein the distribution stem is pierced right through, from upstream to downstream, by a single cleaning and drying fluid distribution channel, which emerges, at the downstream end of said distribution stem, at one or more distribution orifices common to the cleaning fluid and to the drying fluid.

16. The cleaning device according to claim 1, wherein the blocking element is a membrane.

17. A cleaning device for spraying at least one fluid towards a surface to be cleaned of a motor vehicle, comprising:
- at least one fluid intake and distribution device into which are selectively admitted a cleaning fluid and a drying fluid through two distinct sets of runs from an intake end-fitting specific to each fluid,
- wherein the fluid intake and distribution device comprises a blocking element movable between a first position of blocking of a set of runs of one of the fluids and a second position of clearing of the same set of runs,
- wherein in the position of clearing of the set of runs of one of the fluids, the blocking element is configured to at least partially block the other set of runs,
- wherein the blocking element is inserted between an intake cap and an upstream bottom.

* * * * *